US008380852B2

(12) United States Patent
Allen et al.

(10) Patent No.: US 8,380,852 B2
(45) Date of Patent: *Feb. 19, 2013

(54) CLEARING SCSI RESERVATIONS FOR NON-DETECTABLE INITIATORS FOR EXTENDED DURATION

(75) Inventors: James P. Allen, Austin, TX (US); Kiran Kumar Anumalasetty, Bangalore (IN); Sudhir Maddali, Bangalore (IN); Sanket Rathi, Hyderabad (IN); Manish Sharma, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 541 days.

This patent is subject to a terminal disclaimer.

(21) Appl. No.: 12/646,058

(22) Filed: Dec. 23, 2009

(65) Prior Publication Data
US 2011/0173506 A1 Jul. 14, 2011

(51) Int. Cl.
*G06F 15/173* (2006.01)
(52) U.S. Cl. .................... 709/226; 709/223
(58) Field of Classification Search .......... 709/226, 709/223
See application file for complete search history.

(56) References Cited

U.S. PATENT DOCUMENTS

| 7,111,084 | B2 | 9/2006 | Tan et al. |
| 2002/0093961 | A1 | 7/2002 | Sharma et al. |
| 2004/0010584 | A1 | 1/2004 | Peterson et al. |
| 2004/0139240 | A1 | 7/2004 | DiCorpo et al. |
| 2004/0220913 | A1* | 11/2004 | Walker .................... 707/3 |
| 2005/0193231 | A1 | 9/2005 | Scheuren |
| 2005/0268145 | A1 | 12/2005 | Hufferd et al. |
| 2005/0273645 | A1* | 12/2005 | Satran et al. ............... 714/4 |
| 2006/0171330 | A1 | 8/2006 | Mandrell et al. |

OTHER PUBLICATIONS

Schildt, Herbert, "C: The Complete Reference", Fourth Edition, ISBN 0-07-212124-6, p. 76-79, p. 418-422, p. 767-772 and p. 776-777.*
Spirent Knowledge Base, What are some reasons why a GID_PN request is being rejection during a fiber channel device"coming up"? printed Sep. 24, 2012.
American National Standard for Information Technology, Fibre Channel Methodologies for Interconnects (FC-MI) Rev. 0.3, Aug. 1, 2000.

* cited by examiner

*Primary Examiner* — Jerry Dennison
*Assistant Examiner* — Davoud Zand
(74) *Attorney, Agent, or Firm* — Hamilton & Terrile, LLP; Stephen A. Terrile

(57) ABSTRACT

A method, system and computer-usable medium are disclosed for managing storage system resources in a storage area network (SAN). A target data storage server registers itself within a storage area network (SAN) fabric to receive a Registered State Change Notification (RSCN) should a SCSI initiator become inactive. A SCSI initiator then requests reservation of a target LUN. In response, the target data server reserves the LUN for use by the SCSI initiator. If a RSCN is received by the target data storage server, then a GID_PN server request, which comprises the unique identifier of SCSI initiator, is generated after a predetermined time interval and a SAN fabric name server. If the name server's response to the GID_PN server request is positive, then the SCSI initiator was detected as being active and the target data storage server keeps the reservation for the LUN active for the SCSI initiator. Otherwise, the reservation for the LUN is released for use by other SCSI initiators.

12 Claims, 4 Drawing Sheets

CLEARING SCSI RESERVATIONS FOR NON-DETECTABLE INITIATORS FOR EXTENDED DURATION

BACKGROUND OF THE INVENTION

1. Field of the Invention

Embodiments of the disclosure relate in general to the field of computers and similar technologies, and in particular to software utilized in this field. Still more particularly, it relates to managing storage system resources in a storage area network (SAN).

2. Description of the Related Art

A storage area network (SAN) is an architecture for attaching remote computer storage devices, such as disk arrays, to servers in such a way that the storage devices appear as if they were locally attached to the server's operating system. SANs are typically implemented using Small Computer System Interface (SCSI) storage devices, which are used to create Logical Unit Numbers (LUNs), which are SCSI protocol entities that perform typical storage operations such as data reads and writes. A LUN typically corresponds to a storage volume and is represented within a computer operating system as a device. The use of a LUN is typically initiated by a SCSI initiator, such as an information processing system, which issues a reservation request for use of a LUN on a target data storage device. In response to the request, the target data storage device reserves the LUN for exclusive use by the SCSI initiator.

However, if the SCSI initiator (e.g., a host system) abnormally terminates or ends operation while the LUN is still reserved, then the reserved LUN, and its associated storage resources, may be inaccessible to other SCSI initiators. Current approaches to this issue include clearing SCSI-2 reservations on the target data storage device by issuing a LUN reset or a target reset command from a different initiator. In the case of a SCSI-3 reservation, a special command has to be sent from an initiator with a Persistent Reservation (PR) Key authorization. This approach requires explicit action from a SCSI initiator side to clear the reservation. However, when these approaches are employed, no other SCSI initiator can access a LUN until a hard reset or LUN reset is performed in the case of a SCSI-2 initiator, or a PREEMPT command is performed in the case of SCSI-3 initiator. Furthermore, if a SCSI initiator is abnormally terminated while holding a Persistent Reserve, then another SCSI initiator has to issue a PREEMPT and REGISTER command before it can access the LUN.

BRIEF SUMMARY OF THE INVENTION

The present invention includes, but is not limited to, a method, system and computer-usable medium for managing storage system resources in a storage area network (SAN). In various embodiments, a plurality of SCSI initiators are connected to a storage area network (SAN) fabric, which likewise connects one or more data storage servers 212 and a SAN fabric name server. In these and other embodiments, the data storage server comprises a SCSI initiator inactivity detection module and processing logic operable to manage a plurality of Logical Unit Numbers (LUNs).

In various embodiments, the target data storage server registers itself within the SAN fabric to receive a Registered State Change Notification (RSCN) should a SCSI initiator become inactive. Thereafter, a SCSI initiator requests reservation of a target LUN on the target data storage server. In response, the target data server reserves the LUN for use by the SCSI initiator. The target data server then sets an inactivity time interval (e.g., five seconds) on a SCSI initiator inactivity detection timer and the SCSI initiator then uses reserved LUN 'x' 214 to perform processing operations.

If a RSCN is received by the target data storage server, then the SCSI initiator inactivity detection module initiates the SCSI initiator inactivity detection timer, which is then monitored to determine whether the SCSI initiator detection time interval has elapsed. Once the SCSI initiator detection time interval has elapsed, the target data storage server generates a Get Port ID, Port Name (GID_PN) server request, which comprises the unique identifier of SCSI initiator. The GID_PN server request is then sent by the target data storage server to the SAN fabric name server. If the name server's response to the GID_PN server request is positive, then the SCSI initiator was detected as being active and the target data storage server keeps the reservation for the LUN active for the SCSI initiator. However, if the name server's response to the GID_PN server request is negative, then the SCSI initiator was detected as being inactive and the target data storage server releases the reservation for the LUN use by other SCSI initiators. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
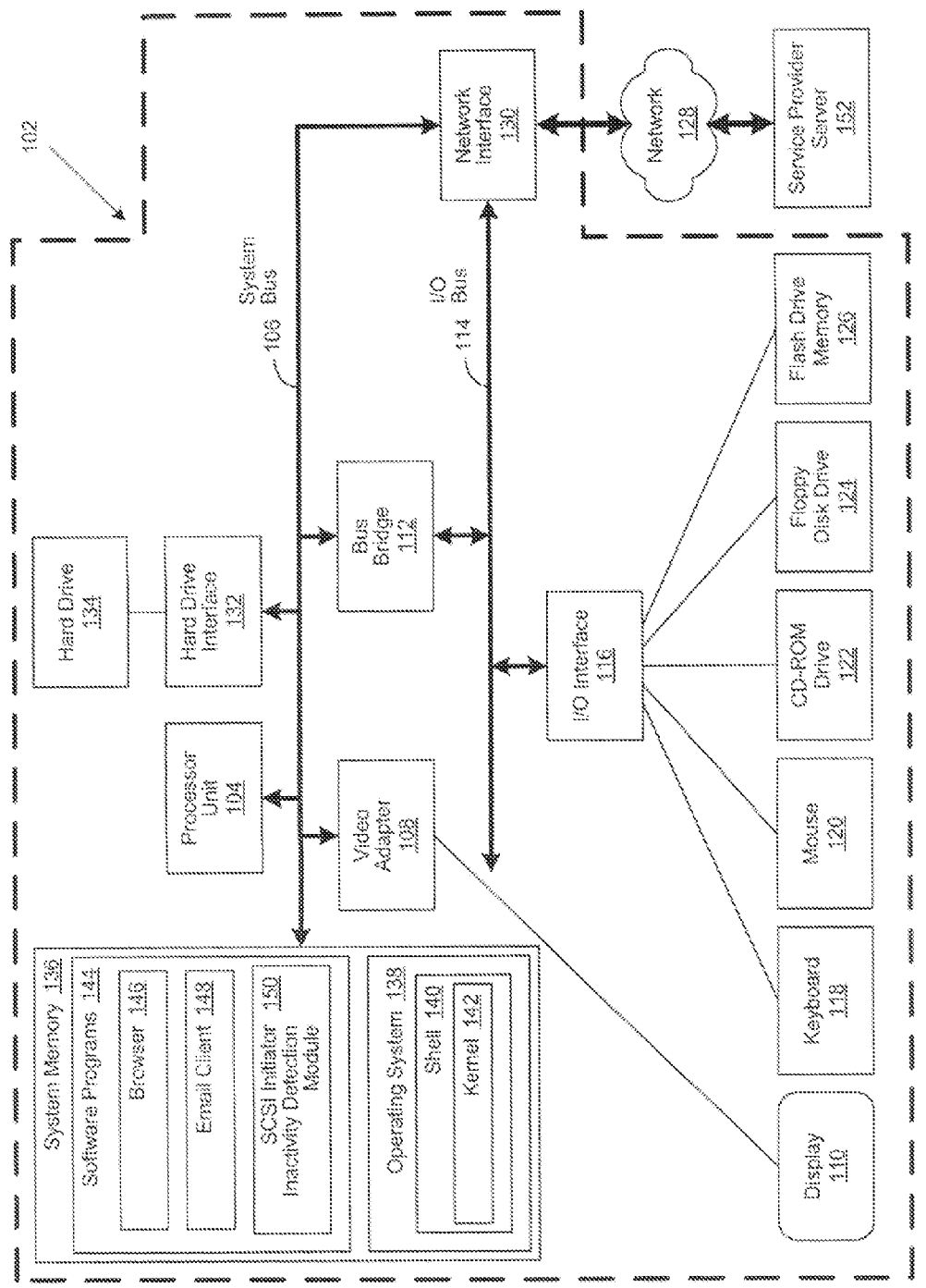
FIG. 1 depicts an exemplary client computer in which the present invention may be implemented.

A method, system, and computer usable medium are disclosed for managing storage system resources in a storage area network (SAN). As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a Small Computer System Interface (SCSI) initiator inactivity detection module 150. The SCSI initiator inactivity detection module 150 includes code for implementing the processes described in FIGS. 2-3 described hereinbelow. In one embodiment, client computer 102 is able to download the SCSI initiator inactivity detection module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
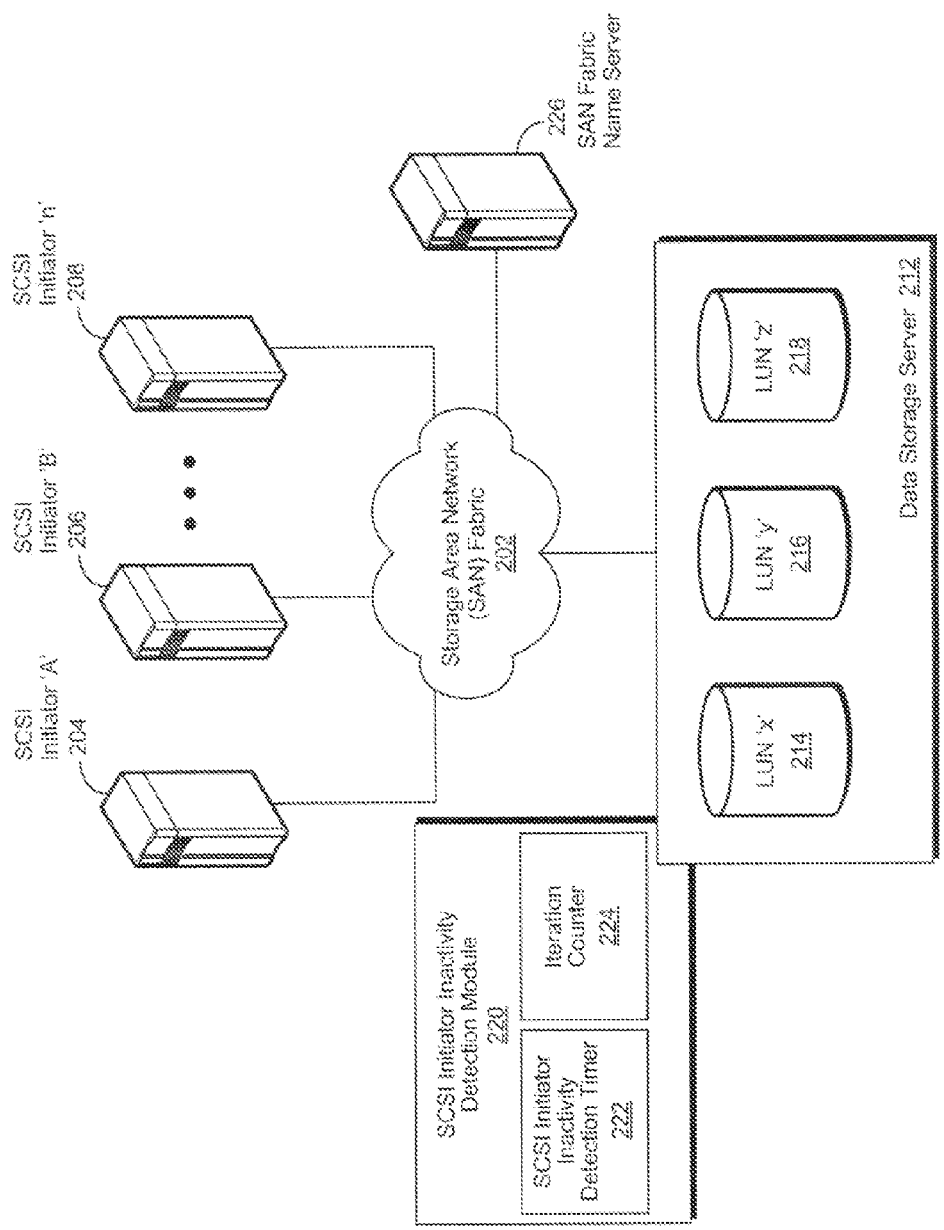
FIG. 2 is a simplified block diagram of a Small Computer System Interface (SCSI) initiator inactivity detection module as implemented in accordance with an embodiment of the invention.

FIG. 2 is a simplified block diagram of a Small Computer System Interface (SCSI) initiator inactivity detection module as implemented in accordance with an embodiment of the invention. In various embodiments, a plurality of SCSI initiators, such as SCSI initiators 'A' 204, 'B' 206 through 'n' 208 are connected to a storage area network (SAN) fabric 202, which likewise connects one or more data storage servers 212 and a SAN fabric name server 226. In these and other embodiments, the data storage server comprises a SCSI initiator inactivity detection module 220 and processing logic operable to generate a plurality of Logical Unit Numbers (LUNs), such as LUNs 'x' 214, 'y' 216, and 'z' 218. As illustrated in FIG. 2, the SCSI initiator inactivity detection module 220 further comprises a SCSI initiator inactivity detection timer 222 and an iteration counter 224.

As used herein, a SCSI initiator refers to an endpoint, such as an information processing system, that initiates a SCSI session by sending a SCSI command familiar to those of skill in the art. The SCSI initiator usually does not provide LUNs, which are SCSI protocol entities that perform typical storage operations such as data reads and writes. Each SCSI target, such as the data storage server 212, provides one or more logical units. A LUN typically corresponds to a storage volume and is represented within a computer operating system as a device.

As illustrated in FIG. 2, an initiator is typically a computer or information processing system and a target is typically a data storage device. In a client-server architecture, an initiator is analogous to the client, and a target is analogous to the server. In various embodiments, the SCSI client comprises a processor, memory, communication ports, installed programs and may or may not have disks or other storage devices physically connected to it. In various embodiments, the target data storage server 212 registers itself within the SAN fabric 202 to receive a Registered State Change Notification (RSCN) should SCSI initiators 'A' 204, 'B' 206 through 'n' 208 become inactive. Thereafter, a SCSI initiator (e.g., SCSI initiator 'A' 204) requests reservation of a target LUN (e.g., LUN 'x' 214) on the target data storage server 212. In response, the target data server 212 reserves LUN 'x' 214 for SCSI initiator 'A' 204. The target data server 212 then sets an inactivity time interval (e.g., five seconds) on a SCSI initiator inactivity detection timer 222, followed by setting an iteration count limit value (e.g., two iterations) for the iteration counter 224. SCSI initiator 'A' 204 then uses reserved LUN 'x' 214 to perform processing operations.

If a RSCN is received by the target data storage server 212, then the SCSI initiator inactivity detection module 220 initiates the SCSI initiator inactivity detection timer 222, followed by incrementing the iteration counter 224 (e.g., by one iteration). The SCSI initiator inactivity detection timer 222 is then monitored to determine whether the SCSI initiator detection time interval has elapsed. Once the SCSI initiator detection time interval has elapsed, the target data storage server 212 generates a GID_PN server request, which comprises the unique identifier of SCSI initiator 'A' 204. The GID_PN server request is then sent by the target data storage server 212 to the SAN fabric name server 226, followed by the target data storage server 212 receiving the name server's 226 response to the GID_PN server request.

A determination is then made by the target data storage server 212 whether the name server's 226 response to the GID_PN server request was positive or negative. If the name server's response to the GID_PN server request was positive, then SCSI initiator 'A' 204 was detected and is therefore active. Accordingly, the target data storage server 212 keeps the reservation for LUN 'x' 214 active for SCSI initiator 'A' 204. The increment iteration counter is then reset. However, if the name server's 226 response to the GID_PN server request was negative, then SCSI initiator 'A' 204 was not detected and therefore inactive. A determination is then made whether the iteration count limit has been exceeded. As an example, a limit of two GID_PN server request iterations, each with a corresponding five second time interval, may have been previously configured by the SCSI initiator inactivity detection module 220. If the iteration count limit has not been exceeded then the SCSI initiator inactivity detection timer 222 is reset and the process is continued for an additional iteration. Otherwise, the reserved LUN 'x' 214 is released for use by SCSI initiators 'B' 206 through 'n' 208.

Skilled practitioners of the art will be aware that a key differentiation between SCSI-2 and SCSI-3 reservations is that SCSI-3 reservations are persistent across power-on, hard-reset, and LUN-reset, whereas SCSI-2 reservations will be lost on a hard-reset, LUN-reset, and power-on. More specifically, in SCSI-3 persistent reservations, the PERSISTENT RESERVE OUT and PERSISTENT RESERVE IN commands provide the basic mechanism for dynamic contention resolution in systems with multiple SCSI initiators accessing a LUN. Before a persistent reservation may be established, the SCSI initiator (e.g., SCSI initiators 'A' 204, 'B' 206 through 'n' 208) registers a reservation key for each I_T nexus with the data storage server 212. The reservation key is used in the PERSISTENT RESERVE IN command to identify which I_T nexuses are registered and which I_T nexus, if any, holds the persistent reservation. The reservation key is used in the PERSISTENT RESERVE OUT command to register an I_T nexus, to verify the I_T nexus being used for the PERSISTENT RESERVE OUT command is registered, and to specify which registrations or persistent reservation to preempt.

In various embodiments, a user-configurable option for SCSI-3 initiator reservations is provided on the storage device server 212, which the user can set through a SAN manager software application. In these and other embodiments, a Disable Persist for Non-Detectable Initiator Capable (DPNDI_C) bit is added in the parameter data of the Report Capabilities service action of the PR IN command Byte 2 Bit 5, which is currently reserved. The DPNDI_C bit indicates that the data storage server 212 will support disabling persistent storage of PR data.

The data storage server 212 likewise sets the above-mentioned DPNDI_C bit to '1' in the parameter data of PR IN command with the service action of the Report Capabilities and a DPNDI bit is added in the Byte 20 Bit 4 parameter of the parameter list, which is passed as part of the PR OUT command with service action of REGISTER. When this bit is set by the user, then the data storage server 212 preserves the information pertaining to an existing registration and clear its Persistent Reservation to let another SCSI initiator (e.g., SCSI initiators 'B' 206 through 'n' 208) access LUN 'x' 214 without sending a PREEMPT command as is widely done now.

Figure 3A:
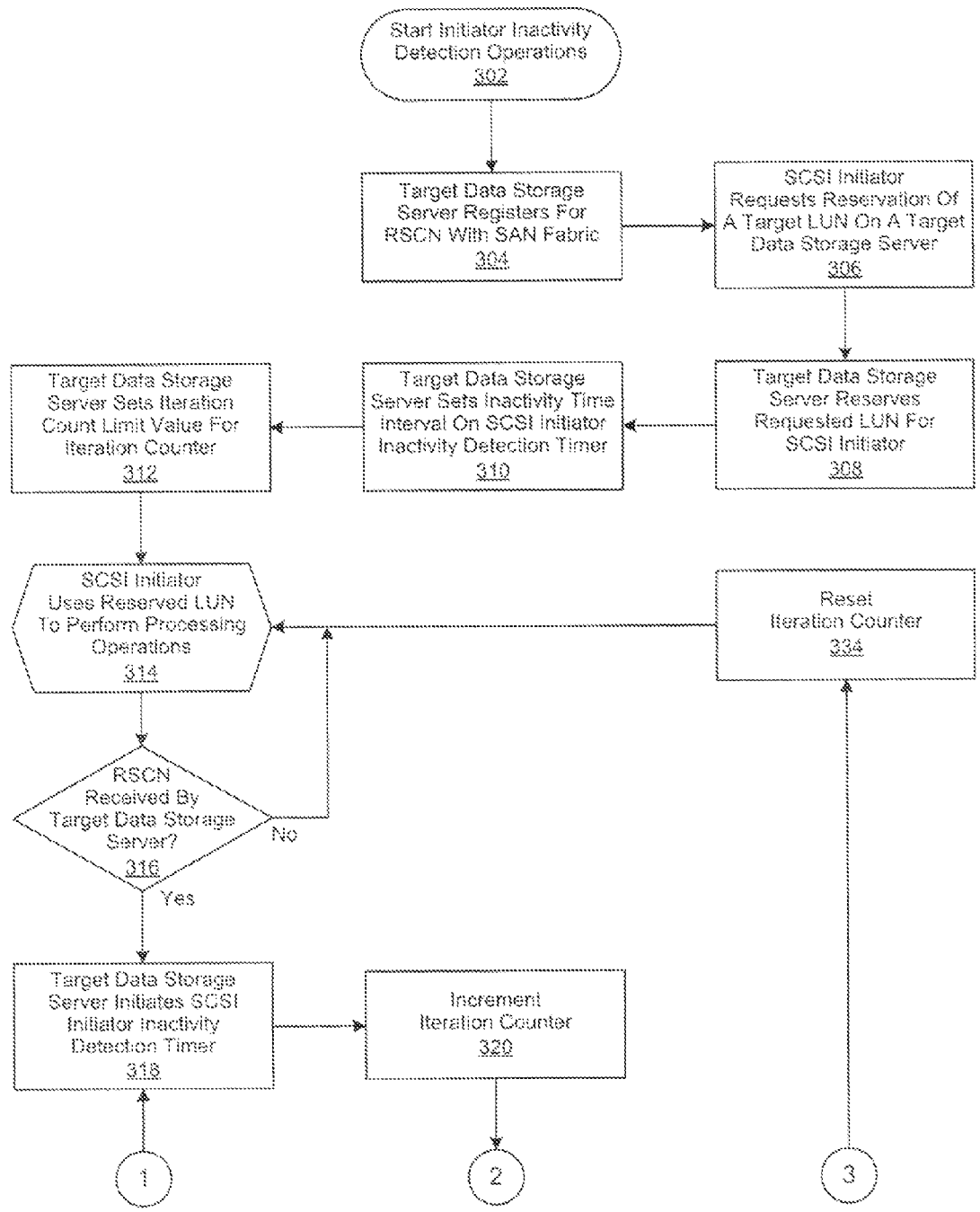
FIG. 3 is a generalized flow chart of the operation of a SCSI initiator inactivity detection module as implemented in accordance with an embodiment of the invention.
Figure 3B:
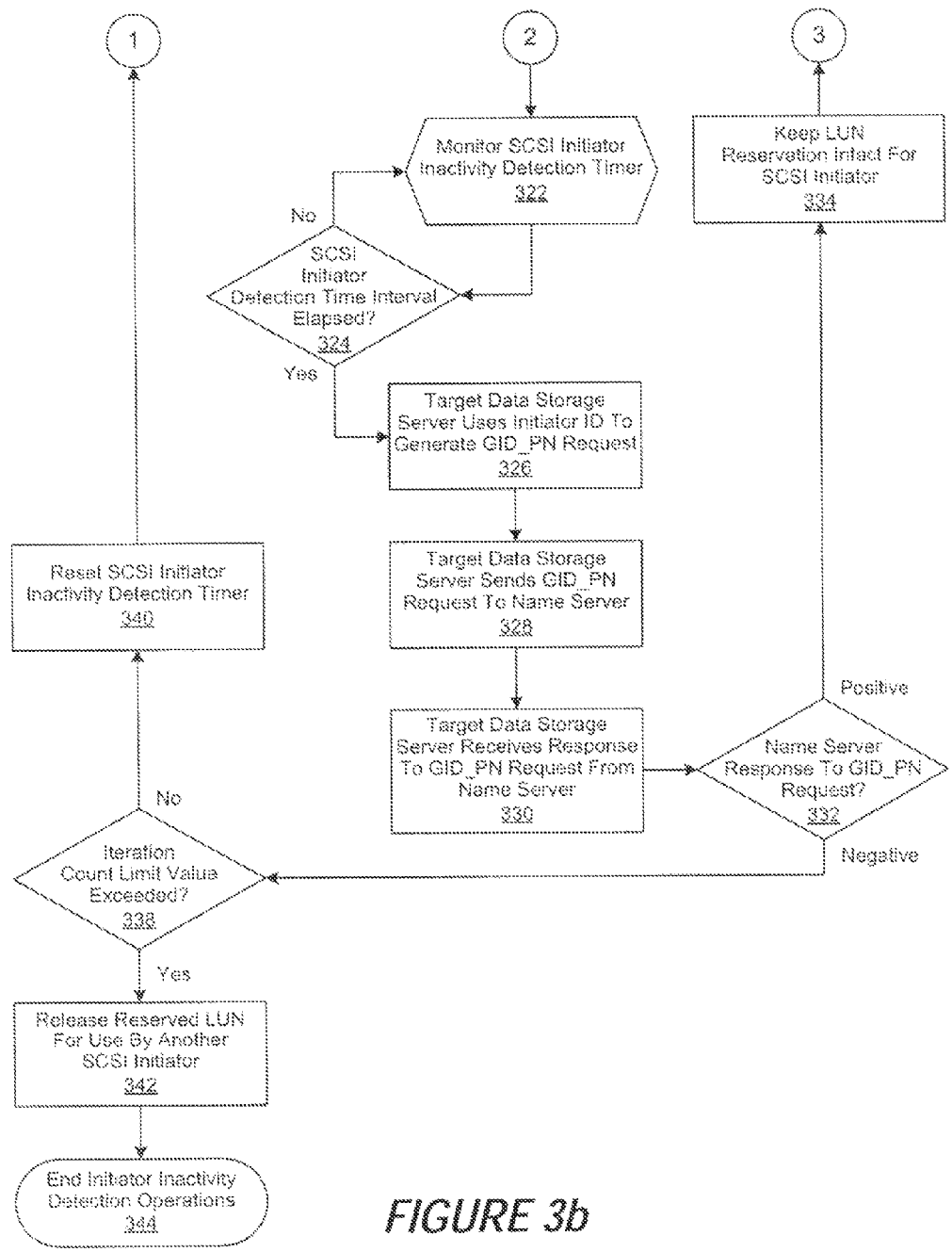

FIG. 3 is a generalized flow chart of the operation of a SCSI initiator inactivity detection module as implemented in accordance with an embodiment of the invention. In this embodiment, initiator inactivity detection operations are begun in step 302. Then, in step 304, a target data storage server registers itself within a storage area network (SAN) fabric to receive a Registered State Change Notification (RSCN) should a Small Computer System Interface (SCSI) initiator implemented within the SAN fabric becomes inactive. In step 306, a SCSI initiator requests reservation of a target LUN on a target data storage server. In response, the target data server reserves the requested LUN for the SCSI initiator in step 308 and then sets an inactivity time interval (e.g., five seconds) on a SCSI initiator inactivity detection timer in step 310, followed by setting an iteration count limit value (e.g., two iterations) for an iteration counter in step 312. The SCSI initiator then uses the reserved LUN to perform processing operations in step 314.

A determination is then made in step 316 whether the target data storage server has received a RSCN indicating the failure of a SCSI initiator. If not, then the process is continued, proceeding with step 314. Otherwise, the target data storage server initiates the SCSI initiator inactivity detection timer in step 318, followed by incrementing the iteration counter (e.g., by one iteration) in step 320. The SCSI initiator inactivity detection timer is monitored in step 322, followed by a determination being made in step 324 whether the SCSI initiator detection time interval has elapsed. If not, then the process is continued, proceeding with step 322.

Otherwise, the target data storage server generates a GID_PN server request, which comprises the unique identifier of the SCSI initiator, in step 326. The GID_PN server request is then sent by the target data storage server to the name server in step 328, followed by the target data storage server receiving the name server's response to the GID_PN server request in step 330. A determination is then made by the target data storage server in step 332 whether the name server's response to the GID_PN server request was positive or negative. If it is determined in step 332 that the name server's response to the GID_PN server request was positive, indicating that the SCSI initiator was detected and therefore active, then the target data storage server keeps the LUN reservation active for the SCSI initiator in step 334. The increment iteration counter is then reset in step 336 and the process continues, proceeding with step 314. However, if it is determined in step 332 that the name server's response to the GID_PN server request was negative, indicating that the SCSI initiator was not detected and therefore inactive, then a determination is made in step 338 whether the iteration count limit has been exceeded. If not, then the SCSI initiator inactivity detection timer is reset in step 340 and the process is continued, proceeding with step 318. Otherwise, the reserved LUN is released for use by another SCSI initiator in step 342 and SCSI initiator inactivity detection operations are ended in step 344.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:
a processor;
a data bus coupled to the processor; and
a computer-usable medium embodying computer program code, the computer-usable medium being coupled to the data bus, the computer program code for managing data storage resources and comprising instructions executable by the processor and configured for:
  receiving a reservation request from a first initiator, said reservation request comprising a request for a data storage resource instance and a unique identifier associated with said first initiator, wherein said unique identifier is generated by a name server;
  reserving said data storage resource instance for said first initiator;
  receiving a registered state change notification (RSCN) upon failure of said first initiator;
  generating a get Port ID, Port Name (GID_PN) name server request to said name server, wherein said GID_PN name server request comprises said unique identifier; and
  releasing said reservation of said data storage resource instance if said name server's response to said GID_PN name server request is negative; and
  wherein
  said first initiator is a SCSI-3 initiator and a Disable Persist for Non-Detectable Initiator Capable (DPN- DI_C) bit is added in the parameter data of the Report Capabilities service action of PR IN command Byte 2 Bit 5.

2. The system of claim 1, further comprising:
   initiating a timer and a counter upon receiving said RSCN, wherein said timer comprises a timer interval value and said counter comprises an iteration count value;
   performing said generating a GID_PN name server request upon said timer interval value elapsing; and
   resetting said timer and incrementing said counter upon said performing of said generating a GID_PN name server request.

3. The system of claim 2, wherein said releasing of said reservation of said data storage resource instance is performed upon said iteration count value exceeds a predetermined number.

4. The system of claim 3, wherein said timer interval value and said iteration count value are user-configurable.

5. A system comprising:
   a processor;
   a data bus coupled to the processor; and
   a computer-usable medium embodying computer program code, the computer-usable medium being coupled to the data bus, the computer program code for managing data storage resources and comprising instructions executable by the processor and configured for:
   receiving a reservation request from a first initiator, said reservation request comprising a request for a data storage resource instance and a unique identifier associated with said first initiator, wherein said unique identifier is generated by a name server;
   reserving said data storage resource instance for said first initiator;
   receiving a registered state change notification (RSCN) upon failure of said first initiator;
   generating a get Port ID, Port Name (GID_PN) name server request to said name server, wherein said GID_PN name server request comprises said unique identifier; and
   releasing said reservation of said data storage resource instance if said name server's response to said GID_PN name server request is negative; and
   wherein:
   said first initiator is a SCSI-3 initiator and a DPNDI bit is added in the Byte 20 Bit 4 in the parameter list, wherein said DPNDI bit is passed as part of a PR OUT command with a REGISTER service action, said data storage device preserving information corresponding to an existing registration and releasing its associated Persistent Reservation to allow a second said initiator to reserve said data storage resource instance without requiring said second initiator to send a PREEMPT command.

6. A non-transitory computer-usable medium embodying computer program code, the computer program code comprising computer executable instructions configured for:
   receiving a reservation request from a first initiator, said reservation request comprising a request for a data storage resource instance and a unique identifier associated with said first initiator, wherein said unique identifier is generated by a name server;
   reserving said data storage resource instance for said first initiator;
   receiving a registered state change notification (RSCN) upon failure of said first initiator;
   generating a get Port ID, Port Name (GID_PN) name server request to said name server, wherein said GID_PN name server request comprises said unique identifier; and
   releasing said reservation of said data storage resource instance if said name server's response to said GID_PN name server request is negative; and wherein
   said first initiator is a SCSI-3 initiator and a Disable Persist for Non-Detectable Initiator Capable (DPNDI_C) bit is added in the parameter data of the Report Capabilities service action of PR IN command Byte 2 Bit 5.

7. The non-transitory computer usable medium of claim 6, further comprising:
   initiating a timer and a counter upon receiving said RSCN, wherein said timer comprises a timer interval value and said counter comprises an iteration count value;
   performing said generating a GID_PN name server request upon said timer interval value elapsing; and
   resetting said timer and incrementing said counter upon said performing of said generating a GID_PN name server request.

8. The non-transitory computer usable medium of claim 6, wherein the computer executable instructions are deployable to a client computer from a server at a remote location.

9. The non-transitory computer usable medium of claim 6, wherein the computer executable instructions are provided by a service provider to a customer on an on-demand basis.

10. The non-transitory computer usable medium of claim 7, wherein said releasing of said reservation of said data storage resource instance is performed upon said iteration count value exceeds a predetermined number.

11. The non-transitory computer usable medium of claim 10, wherein said timer interval value and said iteration count value are user-configurable.

12. A non-transitory computer-usable medium embodying computer program code, the computer program code comprising computer executable instructions configured for:
   receiving a reservation request from a first initiator, said reservation request comprising a request for a data storage resource instance and a unique identifier associated with said first initiator, wherein said unique identifier is generated by a name server;
   reserving said data storage resource instance for said first initiator;
   receiving a registered state change notification (RSCN) upon failure of said first initiator;
   generating a get Port ID, Port Name (GID_PN) name server request to said name server, wherein said GID_PN name server request comprises said unique identifier; and
   releasing said reservation of said data storage resource instance if said name server's response to said GID_PN name server request is negative; and wherein,
   said first initiator is a SCSI-3 initiator and a DPNDI bit is added in the Byte 20 Bit 4 in the parameter list, wherein said DPNDI bit is passed as part of a PR OUT command with a REGISTER service action, said data storage device preserving information corresponding to an existing registration and releasing its associated Persistent Reservation to allow a second said initiator to reserve said data storage resource instance without requiring said second initiator to send a PREEMPT command.

* * * * *